United States Patent
Taniguchi (10) Patent No.: US 12,014,877 B2
(45) Date of Patent: Jun. 18, 2024

(54) CERAMIC ELECTRONIC DEVICE AND MANUFACTURING METHOD OF THE SAME

(71) Applicant: TAIYO YUDEN CO., LTD., Tokyo (JP)

(72) Inventor: Katsuya Taniguchi, Tokyo (JP)

(73) Assignee: TAIYO YUDEN CO., LTD., Tokyo (JP)

( * ) Notice: Subject to any disclaimer, the term of this patent is extended or adjusted under 35 U.S.C. 154(b) by 792 days.

(21) Appl. No.: 16/915,979

(22) Filed: Jun. 29, 2020

(65) Prior Publication Data

US 2021/0012968 A1 Jan. 14, 2021

(30) Foreign Application Priority Data

Jul. 11, 2019 (JP) .................. 2019-129317

(51) Int. Cl.
*H01G 4/30* (2006.01)
*C04B 35/468* (2006.01)
(Continued)

(52) U.S. Cl.
CPC ........... *H01G 4/30* (2013.01); *C04B 35/4682* (2013.01); *H01G 4/008* (2013.01); *H01G 4/012* (2013.01);
(Continued)

(58) Field of Classification Search
CPC .......... H01G 4/30; H01G 4/008; H01G 4/012; H01G 4/1218; C04B 35/4682;
(Continued)

(56) References Cited

U.S. PATENT DOCUMENTS

2013/0094118 A1* 4/2013 Kim .................. H01G 4/30
361/301.4
2013/0301185 A1* 11/2013 Lee .................. H01G 4/30
361/301.4

(Continued)

FOREIGN PATENT DOCUMENTS

| CN | 103971925 A | 8/2014 |
| CN | 109285698 A | 1/2019 |

(Continued)

OTHER PUBLICATIONS

Notice of Reasons for Refusal dated Nov. 1, 2022, in corresponding application JP 2019-129317.
(Continued)

*Primary Examiner* — Arun Ramaswamy
(74) *Attorney, Agent, or Firm* — Stein IP, LLC (57) ABSTRACT

A ceramic electronic device includes: a multilayer structure; and a cover layer, wherein a concentration of Mn of the cover layer with respect to a main component ceramic is larger than a concentration of Mn of the dielectric layers with respect to a main component ceramic in a capacity section, wherein an average crystal grain diameter of a first dielectric layer is smaller than that of a second dielectric layer, and a concentration of Mn of the first dielectric layer with respect to the main component ceramic is larger than a concentration of Mn of the second dielectric layer with respect to the main component ceramic, in the capacity section.

9 Claims, 7 Drawing Sheets

(51) Int. Cl.
  *H01G 4/008* (2006.01)
  *H01G 4/012* (2006.01)
  *H01G 4/12* (2006.01)

(52) U.S. Cl.
  CPC ... *H01G 4/1218* (2013.01); *C04B 2235/6583* (2013.01); *C04B 2235/783* (2013.01)

(58) Field of Classification Search
  CPC ...... C04B 2235/6583; C04B 2235/783; C04B 2235/5683; H10G 4/1218
  USPC ..... 361/301.4, 321.5, 321.4, 311, 312, 321.1
  See application file for complete search history.

(56) References Cited

U.S. PATENT DOCUMENTS

| | | | | |
|---|---|---|---|---|
| 2014/0211367 A1* | 7/2014 | Morita | ............. | H01G 4/30 361/301.4 |
| 2014/0301013 A1* | 10/2014 | Kim | ............. | H01G 4/01 29/25.03 |
| 2016/0194248 A1* | 7/2016 | Yoon | ............. | H01G 4/1227 501/137 |
| 2016/0196918 A1* | 7/2016 | Hong | ............. | H01G 4/232 361/301.4 |
| 2017/0243697 A1 | 8/2017 | Mizuno et al. | | |
| 2017/0345567 A1* | 11/2017 | Sakate | ............. | H01G 4/1218 |
| 2017/0365412 A1 | 12/2017 | Taniguchi et al. | | |
| 2019/0027311 A1 | 1/2019 | Chigira | | |
| 2019/0180936 A1* | 6/2019 | Cha | ............. | C04B 35/47 |

FOREIGN PATENT DOCUMENTS

| | | | |
|---|---|---|---|
| JP | 2002-265260 | A | 9/2002 |
| JP | 2006-253609 | A | 9/2006 |
| JP | 2014-150120 | A | 8/2014 |
| JP | 2017-147429 | A | 8/2017 |
| JP | 2017-212366 | A | 11/2017 |
| JP | 2018-139253 | A | 9/2018 |

OTHER PUBLICATIONS

Notification of the First Office Action dated Dec. 23, 2022, issued by the China National Intellectual Property Administration in corresponding application CN 202010661165.9.

Notification of the Second Office Action dated Jun. 21, 2023, issued by the China National Intellectual Property Administration in corresponding application CN 202010661165.9.

* cited by examiner

CERAMIC ELECTRONIC DEVICE AND MANUFACTURING METHOD OF THE SAME

CROSS-REFERENCE TO RELATED APPLICATION

This application is based upon and claims the benefit of priority of the prior Japanese Patent Application No. 2019-129317, filed on Jul. 11, 2019, the entire contents of which are incorporated herein by reference.

FIELD

A certain aspect of the present invention relates to a ceramic electronic device and a manufacturing method of the ceramic electronic device.

BACKGROUND

Ceramic electronic devices have a capacity section in which internal electrode layers and dielectric layers are alternately stacked, a circumference section (covers, end margins, side margins) and external electrodes. The temperature at which densification of the covers is completed tends to be higher than the temperature at which densification of the capacity section is completed. The temperature difference causes excessive sintering of the capacity section. And it is difficult to secure reliability. And so, there is disclosed technology in which a large amount of manganese is added to the covers in order to promote the densification of the covers (see Japanese Patent Application Publication No. 2017-212366).

SUMMARY OF THE INVENTION

However, in the technology, the manganese diffuses into the capacity section from the covers during a firing. The manganese diffusing into dielectric layers is solid-solved in grains of the dielectric layers. In this case, DC bias characteristic of dielectric constant may be degraded. AC electric field dependence may be enlarged. Effective capacity characteristic may be degraded.

The present invention has a purpose of providing a ceramic electronic device and a manufacturing method of the ceramic electronic device that are capable of securing reliability and suppressing degradation of effective capacity characteristic.

According to an aspect of the present invention, there is provided a ceramic electronic device including: a multilayer structure in which each of a plurality of dielectric layers and each of a plurality of internal electrode layers are alternately stacked, a main component of the dielectric layers being ceramic, the multilayer structure having a rectangular parallelepiped shape, the plurality of internal electrode layers being alternately exposed to a first edge face and a second edge face of the multilayer structure, the first edge face facing with the second edge face; and a cover layer that is provided at least on an upper face and a lower face of the multilayer structure in a stacking direction of the multilayer structure, a main component of the cover layer being ceramic, wherein a concentration of Mn of the cover layer with respect to a main component ceramic of the cover layer is larger than a concentration of Mn of the dielectric layers with respect to a main component ceramic of the dielectric layers in a capacity section in which a set of internal electrode layers exposed to the first edge face of the multilayer structure face with another set of internal electrode layers exposed to the second edge face of the multilayer structure, wherein an average crystal grain diameter of a first dielectric layer is smaller than that of a second dielectric layer, and a concentration of Mn of the first dielectric layer with respect to the main component ceramic is larger than a concentration of Mn of the second dielectric layer with respect to the main component ceramic, in the capacity section, wherein the first dielectric layer is one of the dielectric layers on a side of the cover layer, and the second dielectric layer is another of the dielectric layers on a side of a center section in a stacking direction.

According to another aspect of the present invention, there is provided a manufacturing method of a ceramic electronic device including: forming a ceramic multilayer structure having a multilayer portion and cover sheets provided on an upper face and a lower face of the multilayer portion in a stacking direction, the multilayer portion having a structure in which each of a plurality of dielectric green sheets including main component ceramic powder and each of a plurality of metal conductive paste patterns are alternately stacked, respective one ends of the plurality of metal conductive paste patterns being alternately exposed to a first end face and a second end face of the ceramic multilayer structure, the ceramic multilayer structure having a rectangular parallelepiped shape; the cover sheet having main component ceramic powder; and firing the ceramic multilayer structure, wherein a concentration of Mn of the cover sheet with respect to the main component ceramic of the cover sheet is larger than a concentration of Mn of the dielectric green sheet with respect to the main component ceramic of the dielectric green sheet, before the firing, wherein an average particle diameter of the main component ceramic of one of the dielectric green sheet on a side of the cover sheet in a stacking direction is larger than an average particle diameter of the main component ceramic of another of the dielectric green sheet on a side of the center section in the stacking direction, before the firing.

According to another aspect of the present invention, there is provided a manufacturing method of a ceramic electronic device including: forming a ceramic multilayer structure having a multilayer portion and cover sheets provided on an upper face and a lower face of the multilayer portion in a stacking direction, the multilayer portion having a structure in which each of a plurality of dielectric green sheets including main component ceramic powder and each of a plurality of metal conductive paste patterns are alternately stacked, respective one ends of the plurality of metal conductive paste patterns being alternately exposed to a first end face and a second end face of the ceramic multilayer structure, the ceramic multilayer structure having a rectangular parallelepiped shape; the cover sheet having main component ceramic powder; and firing the ceramic multilayer structure, wherein a concentration of Mn of the cover sheet with respect to the main component ceramic of the cover sheet is larger than a concentration of Mn of the dielectric green sheet with respect to the main component ceramic of the dielectric green sheet, before the firing, wherein an amount of a binder of one of the dielectric green sheet on a side of a center section in a staking direction is larger than an amount of the binder of another of the dielectric green sheet on a side of the cover sheet, before the firing.

DETAILED DESCRIPTION

A description will be given of an embodiment with reference to the accompanying drawings.

Figure 1:
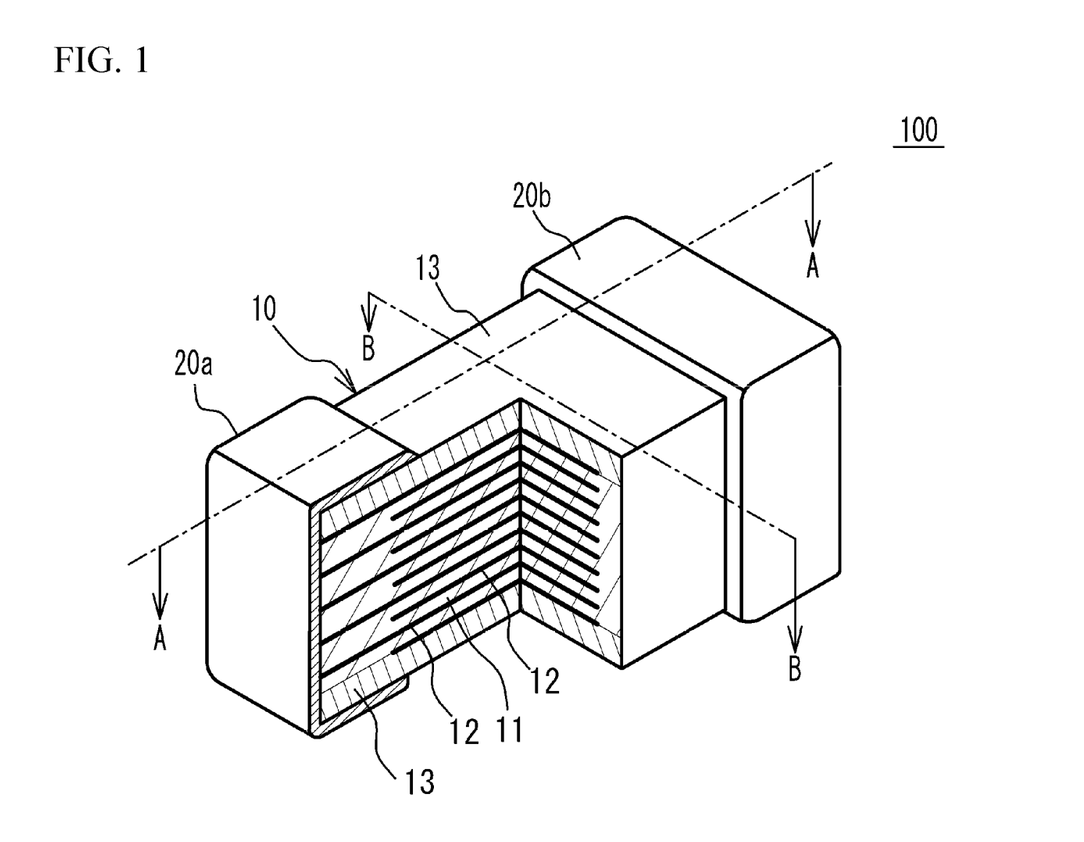
FIG. 1 illustrates a perspective view of a multilayer ceramic capacitor in which a cross section of a part of the multilayer ceramic capacitor is illustrated.
Figure 2:
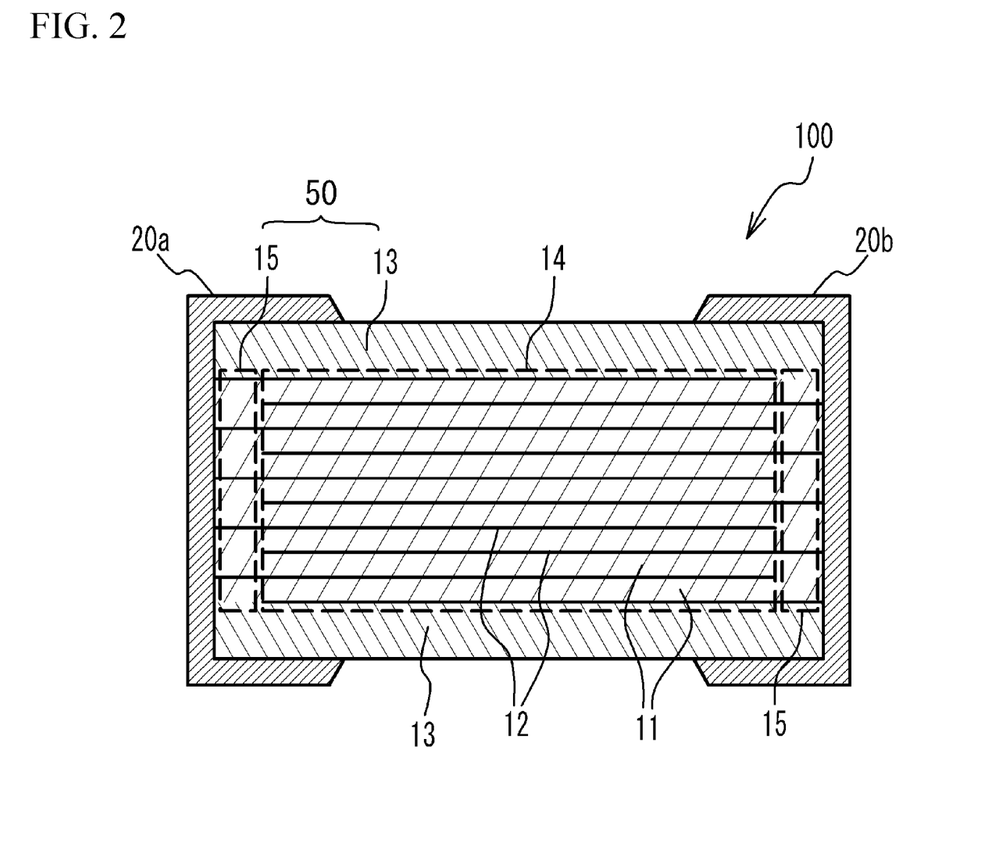
FIG. 2 illustrates a cross sectional view taken along a line A-A of FIG. 1.
Figure 3:
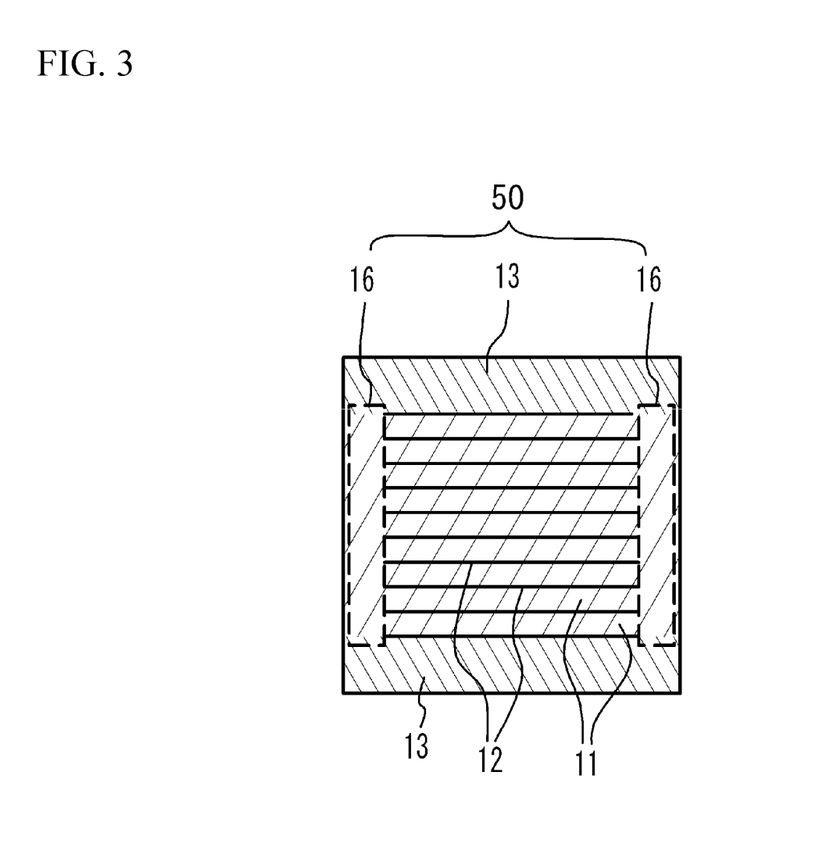
FIG. 3 illustrates a cross sectional view taken along a line B-B of FIG. 1.

(Embodiment) A description will be given of an outline of a multilayer ceramic capacitor, as an example of a ceramic electronic device. FIG. 1 illustrates a perspective view of a multilayer ceramic capacitor 100 in accordance with an embodiment, in which a cross section of a part of the multilayer ceramic capacitor 100 is illustrated. FIG. 2 illustrates a cross sectional view taken along a line A-A of FIG. 1. FIG. 3 illustrates a cross sectional view taken along a line B-B of FIG. 1. As illustrated in FIG. 1 to FIG. 3, the multilayer ceramic capacitor 100 includes a multilayer chip 10 having a rectangular parallelepiped shape, and a pair of external electrodes 20a and 20b that are respectively provided at two end faces of the multilayer chip 10 facing each other. In four faces other than the two end faces of the multilayer chip 10, two faces other than an upper face and a lower face of the multilayer chip 10 in a stacking direction are referred to as side faces. The external electrodes 20a and 20b extend to the upper face, the lower face and the two side faces of the multilayer chip 10. However, the external electrodes 20a and 20b are spaced from each other.

The multilayer chip 10 has a structure designed to have dielectric layers 11 and internal electrode layers 12 alternately stacked. The dielectric layer 11 includes ceramic material acting as a dielectric material. End edges of the internal electrode layers 12 are alternately exposed to a first end face of the multilayer chip 10 and a second end face of the multilayer chip 10 that is different from the first end face. In the embodiment, the first end face faces with the second end face. The external electrode 20a is provided on the first end face. The external electrode 20b is provided on the second end face. Thus, the internal electrode layers 12 are alternately conducted to the external electrode 20a and the external electrode 20b. Thus, the multilayer ceramic capacitor 100 has a structure in which a plurality of dielectric layers 11 are stacked and each two of the dielectric layers 11 sandwich the internal electrode layer 12. In a multilayer structure of the dielectric layers 11 and the internal electrode layers 12, the internal electrode layer 12 is positioned at an outermost layer in a stacking direction. The upper face and the lower face of the multilayer structure that are the internal electrode layers 12 are covered by cover layers 13. A main component of the cover layer 13 is a ceramic material. For example, a main component of the cover layer 13 is the same as that of the dielectric layer 11.

For example, the multilayer ceramic capacitor 100 may have a length of 0.25 mm, a width of 0.125 mm and a height of 0.125 mm. The multilayer ceramic capacitor 100 may have a length of 0.4 mm, a width of 0.2 mm and a height of 0.2 mm. The multilayer ceramic capacitor 100 may have a length of 0.6 mm, a width of 0.3 mm and a height of 0.3 mm. The multilayer ceramic capacitor 100 may have a length of 1.0 mm, a width of 0.5 mm and a height of 0.5 mm. The multilayer ceramic capacitor 100 may have a length of 3.2 mm, a width of 1.6 mm and a height of 1.6 mm. The multilayer ceramic capacitor 100 may have a length of 4.5 mm, a width of 3.2 mm and a height of 2.5 mm. However, the size of the multilayer ceramic capacitor 100 is not limited.

A main component of the internal electrode layers 12 is nickel (Ni). The dielectric layers 11 are mainly composed of a ceramic material having a perovskite structure expressed by a general formula $ABO_3$. The perovskite structure includes $ABO_{3-\alpha}$ having an off-stoichiometric composition. In the embodiment, the ceramic material is $BaTiO_3$ (barium titanate).

As illustrated in FIG. 2, a section, in which a set of the internal electrode layers 12 connected to the external electrode 20a face another set of the internal electrode layers 12 connected to the external electrode 20b, is a section generating electrical capacity in the multilayer ceramic capacitor 100. And so, the section is referred to as a capacity section 14. That is, the capacity section 14 is a section in which the internal electrode layers 12 next to each other being connected to different external electrodes face each other.

A section, in which the internal electrode layers 12 connected to the external electrode 20a face with each other without sandwiching the internal electrode layer 12 connected to the external electrode 20b, is referred to as an end margin section 15. A section, in which the internal electrode layers 12 connected to the external electrode 20b face with each other without sandwiching the internal electrode layer 12 connected to the external electrode 20a is another end margin section 15. That is, the end margin section 15 is a section in which a set of the internal electrode layers 12 connected to one external electrode face with each other without sandwiching the internal electrode layer 12 connected to the other external electrode. The end margin section 15 is a section that does not generate electrical capacity in the multilayer ceramic capacitor 100.

As illustrated in FIG. 3, a section of the multilayer chip 10 from the two sides thereof to the internal electrode layers 12 is referred to as a side margin section 16. That is, the side margin section 16 is a section covering edges of the stacked internal electrode layers 12 in the extension direction toward the two side faces.

The cover layers 13, the end margin sections 15 and the side margin sections 16 surrounds the capacity section 14. And so, in the following description, the cover layers 13, the end margin sections 15 and the side margin sections 16 are referred to as a circumference section 50.

The internal electrode layers 12 are formed by sintering metal conductive paste including metal powder. The dielectric layers 11 and the cover layers 13 are formed by firing dielectric green sheets including ceramic powder. However, the density of the capacity section 14 before firing is different from the density of the cover layer 13 before firing, because of a difference of materials. In the capacity section 14, the internal electrode layers 12 are stacked. Influence of metal diffusion on the cover layers 13 is different from influence of the metal diffusion on the dielectric layers 11 in the capacity section 14. Accordingly, the temperature at which the densification of the cover layers 13 is completed tends to be higher than the temperature at which the densification of the capacity section 14 is completed. When the densification of the cover layer 13 is completed, the capacity section 14 is excessively sintered because of the temperature difference. And it may be difficult to secure the reliability of the multilayer ceramic capacitor 100.

And so, it is thought that Mn (manganese) is used in order to promote the densification. In concrete, it is thought that the concentration of Mn of the cover layers 13 is larger than that of the dielectric layers 11 in the capacity section 14. However, in this structure, Mn diffuses into the capacity section 14 from the cover layers 13 in firing. Mn diffusing into the dielectric layers 11 in the capacity section 14 is solid-solved in the ceramic. In this case, the DC bias characteristic of the dielectric constant may be degraded. The AC electric field dependence may be enlarged. The effective capacity characteristic may be degraded.

And so, the multilayer ceramic capacitor 100 of the embodiment has a structure for securing the reliability and suppressing degradation of the effective capacity characteristic.

The concentration of Mn of the cover layers 13 is larger than the concentration of Mn of each of the dielectric layers 11 in the capacity section 14. The concentration of Mn in this case is atm % (atomic concentration) of Mn on a presumption that the concentration of the B site element of the main component ceramic having the perovskite structure expressed by a general formula $ABO_3$ is 100 atm %. For example, when the main component ceramic of the dielectric layers 11 and the cover layers 13 is $BaTiO_3$, the concentration of Mn is atm % of Mn on a presumption that the concentration of Ti is 100 atm %. With the structure, the densification of the cover layers 13 is promoted. The difference between the temperature at which the densification of the capacity section 14 is completed and the temperature at which the densification of the cover layers 13 is completed is reduced. Therefore, the excessive sintering of the capacity section 14 is suppressed. And the reliability of the multilayer ceramic capacitor 100 is secured.

Figure 4:
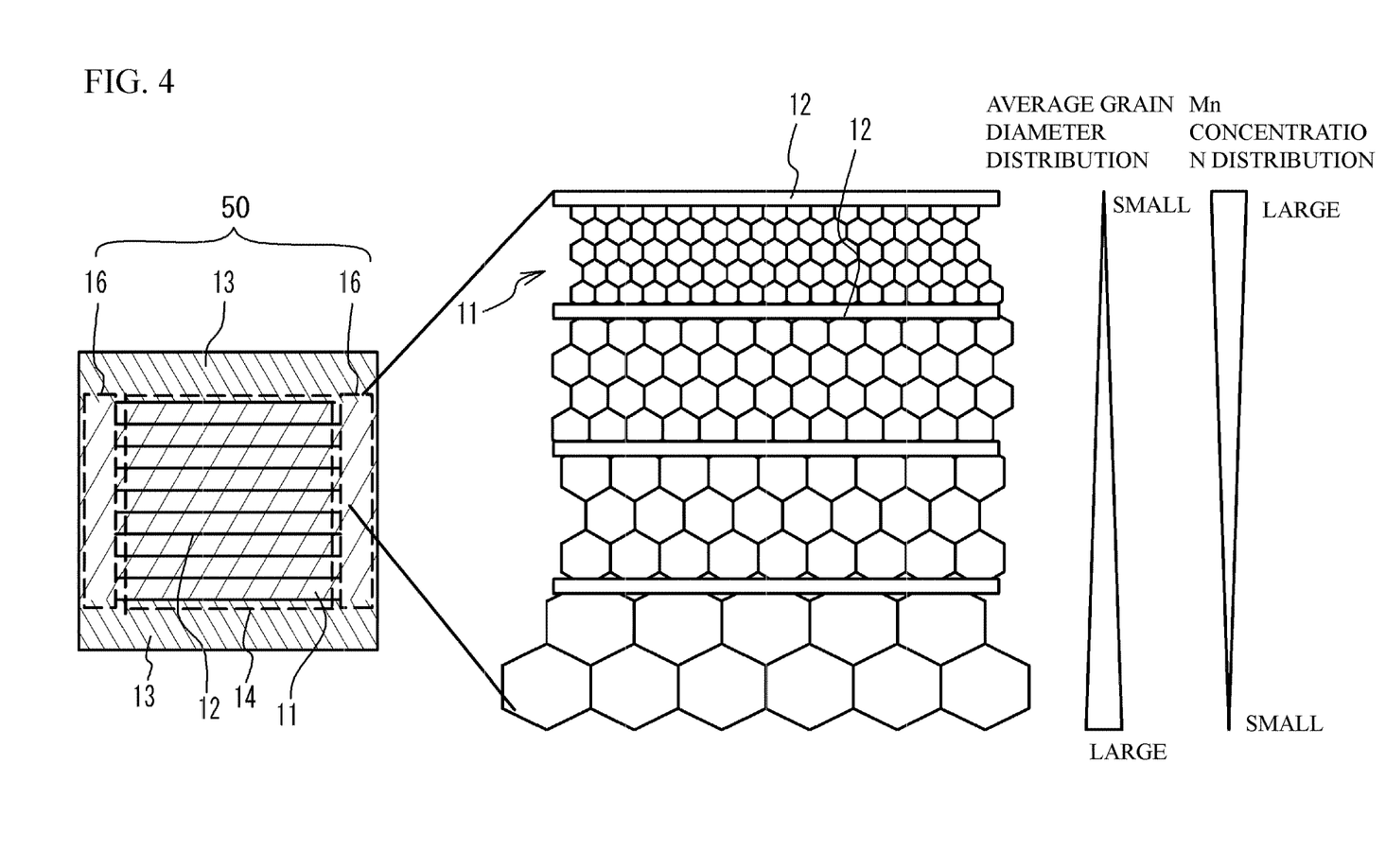
FIG. 4 illustrates a relationship between an average crystal grain diameter and a concentration of Mn.

Next, as illustrated in FIG. 4, in the capacity section 14, the average crystal grain diameter of each of the dielectric layers 11 increases gradually or in steps from the side of the cover layers 13 toward the center section in the stacking direction. Thus, a crystal grain diameter gradation is formed. For example, in the capacity section 14, the average crystal grain diameter of the dielectric layer 11 next to the cover layer 13 is the smallest. The average crystal grain diameter of the second dielectric layer 11 from the cover layer 13 in the stacking direction is the second smallest. The average crystal grain diameter of the third dielectric layer from the cover layer 13 is the third smallest. With the structure, the number of crystal grain boundary in the dielectric layer 11 on the side of the cover layer 13 is large. The number of crystal grain boundary in the dielectric layer 11 on the side of the center section in the stacking direction is small. Mn diffusing from the cover layer 13 tends to exist in the crystal grain boundary. Even if Mn diffuses into the dielectric layer 11 near the cover layer 13, Mn tends to exist in the crystal grain boundary. Thus, solid-solution of Mn in the main component ceramic in the dielectric layer 11 is suppressed. The average crystal grain diameter of the dielectric layer on the side of the center section in the stacking direction is large. The high dielectric constant is obtained. The dielectric layer 11 on the side of the center section in the stacking direction is away from the cover layer 13. The amount of Mn diffusing to the dielectric layer is suppressed. Even if the average crystal grain diameter is large, the solid-solution of Mn is suppressed. In this manner, in the capacity section 14, the crystal grain diameter gradation in which the average crystal grain diameter of each of the dielectric layers 11 increases gradually or in steps from the cover layer 13 side toward the center section side in the stacking direction is formed. The solid-solution of Mn in the main component ceramic of the dielectric layer 11 is suppressed. And the high dielectric constant is achieved. It is therefore possible to secure the reliability and suppress the degradation of the effective capacity characteristic in the multilayer ceramic capacitor 100.

In the embodiment, the capacity section 14 has a concentration gradation of Mn. In the concentration gradation, the concentration of Mn of each of the dielectric layers 11 decreases gradually or in steps from the cover layers 13 toward the center section in the stacking direction. The capacity section 14 has a gradation of an average crystal grain diameter. In the gradation, the average crystal grain diameter in each of the dielectric layers 11 increases gradually or in steps from the cover layer 13 side toward the center section of the stacking direction. For example, in the capacity section 14, the concentration of Mn is the largest and the average crystal grain diameter is the smallest in the dielectric layer 11 which are next to the cover layer 13. The concentration of Mn is the second largest and the average crystal grain diameter is the second smallest in the second dielectric layer 11 from the cover layer 13 in the stacking direction. The concentration of Mn is the third largest and the average crystal grain diameter is the third smallest in the third dielectric layer from the cover layer 13 in the stacking direction.

In the capacity section 14, the concentrations of Mn and the average crystal grain diameters of two of the dielectric layers 11 next to each other in the stacking direction may not be necessarily different from each other. For example, in the capacity section 14, the concentrations of Mn and the average crystal grain diameters of two or more of the dielectric layers 11 may be substantially the same as each other. In this case, the concentration of Mn of another one of the dielectric layers 11 which is closer to the cover layer 13 than the two or more of the dielectric layers 11 is larger than that of the two or more of the dielectric layers 11, and the average crystal grain diameter of the another one of the dielectric layers 11 is smaller than that of the two or more of the dielectric layers 11. Alternatively, the concentration of Mn of another one of the dielectric layers 11 which is closer to the center section than the two or more of the dielectric layers 11 is smaller than that of the two or more of the dielectric layers 11, and the average crystal grain diameter of the another one of the dielectric layers 11 is larger than that of the two or more of the dielectric layers 11.

In the capacity section 14, the concentration of Mn may not necessarily monotonically decrease from the dielectric layer 11 which is the closest to the cover layer 13 toward the dielectric layer 11 of the center section. In the capacity section 14, the average crystal grain diameter may not necessarily monotonically increase from the dielectric layer 11 which is the closest to the cover layer 13 toward the dielectric layer of the center section. For example, the concentration of Mn of a first dielectric layer is larger than that of a second dielectric layer, and the average crystal grain diameter of the first dielectric layer is smaller than that of the second dielectric layer. The first dielectric layer is one of the dielectric layers on the side of the cover layer between the center of the capacity section 14 and the cover layer 13. The second dielectric layer is another of the dielectric layers 11 on the side of the center of the capacity section 14.

When the average crystal grain diameter of the first dielectric layer in the capacity section 14 is not sufficiently small, the number of the crystal grain boundary in the first dielectric layer may not be necessarily large. And so, it is preferable that the average crystal grain diameter of the first dielectric layer has an upper limit. For example, it is preferable that the average crystal grain diameter of the first dielectric layers is less than 250 nm. It is more preferable the average crystal grain diameter is 200 nm or less. It is still more preferable that the average crystal grain diameter is 150 nm or less.

When the average crystal grain diameter of the second dielectric layer in the capacity section 14 is not sufficiently large, the dielectric constant of the second dielectric layer may not be necessarily high. And so, it is preferable that the average crystal grain diameter of the second dielectric layer has a lower limit. For example, it is preferable that the average crystal grain diameter of the second dielectric layers is 250 nm or more. It is more preferable the average crystal grain diameter is 300 nm or more. It is still more preferable that the average crystal grain diameter is 500 nm or more.

When the concentration of Mn of the first dielectric layer in the capacity section 14 is not sufficiently small, Mn may be solid-solved in the dielectric layer 11 in the capacity section 14. It is preferable that the concentration of Mn of the first dielectric layer has an upper limit. For example, it is preferable that the concentration of Mn of the first dielectric layer is 1.5 atm % or less. It is more preferable that the concentration of Mn is 1.2 atm % or less. It is still more preferable that the concentration of Mn is 0.9 atm % or less.

When the concentration of Mn of the cover layer 13 is excessively small, the temperature at which densification of the cover layer 13 is completed may not be necessarily small. And so, it is preferable that the concentration of Mn of the cover layer 13 has a lower limit. It is preferable that the concentration of Mn is 0.5 atm % or more. It is more preferable that the concentration of Mn is 0.7 atm % or more. It is still more preferable that the concentration of Mn is 0.9 atm % or more.

When the number of the stacked dielectric layers 11 is large, the temperature at which densification of the dielectric layers 11 is completed may get lower. Therefore, when the average thickness of the dielectric layers 11 gets smaller, the effect of the embodiment gets more remarkable. For example, the average thickness of each of the dielectric layers 11 is 0.8 μm or less, 0.7 μm or less, or 0.6 μm or less.

Figure 5:
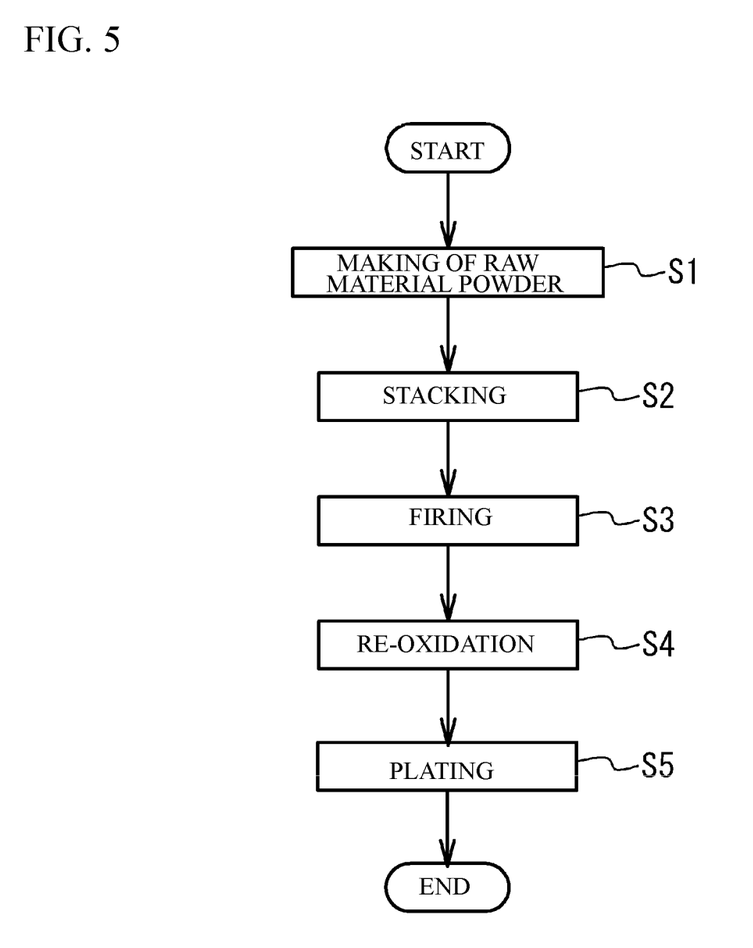
FIG. 5 illustrates a manufacturing method of a multilayer ceramic capacitor.

Next, a description will be given of a manufacturing method of the multilayer ceramic capacitor 100. FIG. 5 illustrates a manufacturing method of the multilayer ceramic capacitor 100.

(Making process of raw material powder) A dielectric material for forming the dielectric layers 11 is prepared. Generally, an A site element and a B site element are included in the dielectric layers 11 in a sintered phase of grains of $ABO_3$. For example, $BaTiO_3$ is tetragonal compound having a perovskite structure and has a high dielectric constant. Generally, $BaTiO_3$ is obtained by reacting a titanium material such as titanium dioxide with a barium material such as barium carbonate and synthesizing barium titanate. Various methods can be used as a synthesizing method of the ceramic structuring the dielectric layers 11. For example, a solid-phase method, a sol-gel method, a hydrothermal method or the like can be used. The embodiment may use any of these methods.

An average particle diameter of the main component ceramic powder is, for example, 80 nm or more ad 150 nm or less. An additive compound may be added to resulting ceramic powders, in accordance with purposes. The additive compound may be an oxide of Mg (magnesium), Mn, V (vanadium), Cr (chromium) or a rare earth element (Y (yttrium), Sm (samarium), Eu (europium), Gd (gadolinium), Tb (terbium), Dy (dysprosium), Ho (holmium), Er (erbium), Tm (thulium) and Yb (ytterbium)), or an oxide of Co (cobalt), Ni, Li (lithium), B (boron), Na (sodium), K (potassium) and Si (silicon), or glass.

Next, a cover material for forming the cover layers 13 is prepared. The main component ceramic of the cover material is the same as that of the dielectric material. However, the concentration of Mn in the additive compound is larger than that of the dielectric material.

(Stacking process) Next, a binder such as polyvinyl butyral (PVB) resin, an organic solvent such as ethanol or toluene, and a plasticizer are added to the resulting dielectric material made in the making process of the raw material powder and wet-blended. With use of the resulting slurry, a base material is coated with a strip-shaped dielectric green sheet with a thickness of 0.8 μm or less by, for example, a die coater method or a doctor blade method, and then dried.

Next, metal conductive paste for forming an internal electrode is provided on the surface of the dielectric green sheet by screen printing or gravure printing. The metal conductive paste includes an organic binder. Thus, a pattern for forming an internal electrode layer is provided. As co-materials, ceramic particles are added to the metal conductive paste. A main component of the ceramic particles is not limited. However, it is preferable that the main component of the ceramic particles is the same as that of the dielectric layer 11.

Then, each of a plurality of stack units are alternately stacked while the base material is peeled so that the internal electrode layers 12 and the dielectric layers 11 are alternated with each other and the end edges of the internal electrode layers 12 are alternately exposed to both end faces in the length direction of the dielectric layer 11 so as to be alternately led out to a pair of the external electrodes 20a and 20b of different polarizations. For example a total number of the staked stack units is 100 to 500. In this case, the average particle diameter of the main component ceramic powder of 10 to 20 numbers of the dielectric green sheets on the side of the cover layer 13 is larger than the average particle diameter of the main component ceramic powder of another dielectric green sheet on the side of the center in the stacking direction, between the center of the multilayer structure and the cover layer 13. For example, the average particle diameter of the main component ceramic of 10 to 20 numbers of the dielectric green sheets on the side of the cover layer 13 is larger than the average particle diameter of the main component ceramic of another dielectric green sheet on the side of the center by 10% to 20%, between the center of the multilayer structure and the cover layer 13.

Next, a binder such as polyvinyl butyral (PVB) resin, an organic solvent such as ethanol or toluene, and a plasticizer are added to the resulting cover material made in the making process of the raw material powder and wet-blended. With use of the resulting slurry, a base material is coated with a strip-shaped cover sheet with a thickness of 10 μm or less by, for example, a die coater method or a doctor blade method, and then dried. A predetermined number of cover sheets (for example, 2 to 10) are stacked on the stacked dielectric green sheets. Another predetermined number of cover sheets are stacked under the stacked dielectric green sheets. After that, a green multilayer structure was obtained by a thermal crimping. And the green multilayer structure is cut into a predetermined size (for example, 1.0 mm×0.5 mm). After that, metal conductive paste to be the external electrodes 20a and 20b is applied on both end faces of the resulting multilayer structure by a dipping method and is dried. Thus, a ceramic multilayer structure is obtained. A predetermined number of cover sheets which are stacked and crimped may be stacked over the stacked dielectric green sheets and under the stacked dielectric green sheets.

(Firing process) The binder is removed from the resulting ceramic multilayer structure in $N_2$ atmosphere. Ni paste acting as a ground layer of the external electrodes 20a and 20b are applied to two end faces of the ceramic multilayer structure by a dipping method. The resulting ceramic multilayer structure is fired for ten minutes to 2 hours in a reductive atmosphere having an oxygen partial pressure of $10^{-5}$ to $10^{-8}$ atm in a temperature range of 1100 degrees C. to 1300 degrees C. In this manner, it is possible to manufacture the multilayer ceramic capacitor 100.

(Re-oxidizing process) After that, a re-oxidizing process may be performed in $N_2$ gas atmosphere in a temperature range of 600 degrees C. to 1000 degrees C.

(Plating process) The external electrodes 20a and 20b may be coated with metals such as Cu, Ni, and Sn by a plating.

In the embodiment, the concentration of Mn of the cover sheet is larger than the concentration of Mn of the dielectric green sheet. Therefore, the densification of the cover layer 13 is promoted. And the difference between the temperature at which the densification of the capacity section 14 is completed and the temperature at which the densification of the cover layer 13 is completed is reduced. Therefore, the excessive sintering of the capacity section 14 is suppressed. And the reliability of the multilayer ceramic capacitor 100 is secured.

An average particle diameter of the main component ceramic powder of the dielectric green sheet close to the cover sheet is larger than that of the dielectric green sheet on the side of the center section in the stacking direction. In this case, the grain growth of the dielectric green sheet close to the cover sheet is suppressed. Moreover, Mn diffuses toward the stacking direction from the cover sheet. Therefore, the concentration of Mn in the dielectric green sheet close to the cover sheet is larger than that of the dielectric green sheet on the side of the center section in the stacking direction. Mn has a function of suppressing the grain growth. Therefore, the grain growth is suppressed in the dielectric green sheet close to the cover sheet. Accordingly, in the capacity section 14, the average crystal grain diameter of the dielectric layer 11 close to the cover layer 13 is smaller than that of the dielectric layer 11 on the side of the center section in the stacking direction. Thus, the number of the crystal grain boundary of the dielectric layer 11 on the side of the cover layer 13 gets larger. And the solid-solution of Mn is suppressed in the dielectric layer 11 on the side of the cover layer 13. The dielectric layer 11 on the side of the center section in the stacking direction is away from the cover layer 13. Therefore, an amount of Mn diffusing into the dielectric layer 11 on the side of the center section is small. Even if the average crystal grain diameter is large, solid solution of Mn is suppressed. In this manner, in the capacity section 14, the crystal grain diameter gradation, in which the average crystal grain diameter of the dielectric layers 11 increases gradually or in steps from the side of the cover layer 13 toward the center section in the stacking direction, is formed. And, the solid-solution of Mn in the main component ceramic of the dielectric layers 11 is suppressed. And a high dielectric constant is achieved. Accordingly, in the multilayer ceramic capacitor 100 of the embodiment, the reliability is secured, and the degradation of the effective capacity characteristic is suppressed.

When the concentration difference between the concentration of Mn of the cover sheet and the concentration of Mn of the dielectric green sheet is not sufficiently large, the difference between the temperature at which the densification of the cover layer 13 is completed and the temperature at which the densification of the capacity section may not be necessarily small. And so, it is preferable that the concentration difference between the concentration of Mn of the cover sheet and the concentration of Mn of the dielectric green sheet has a lower limit. For example, it is preferable that the concentration difference is 0.3 atm % or more. It is more preferable that the concentration difference is 0.5 atm % or more. It is still more preferable that the concentration difference is 0.75 atm % or more. When the cover sheet is not sufficiently thick, the amount of Mn of the cover sheet may not be necessarily large. And so, it is preferable that the thickness of the cover sheet has a lower limit. For example, it is preferable that the thickness of the cover sheet is 5 μm or more. It is more preferable that the thickness of the cover sheet is 10 μm or more. It is still more preferable that the thickness of the cover sheet is 15 μm or more.

When the concentration of Mn of the cover sheet is excessively small, the temperature at which densification of the cover layer 13 is completed may not be necessarily small. And so, it is preferable that the concentration of Mn of the cover sheet has a lower limit. It is preferable that the concentration of Mn is 0.5 atm % or more, on a presumption that the concentration of the main component ceramic of the cover sheet is 100 atm %. It is more preferable that the concentration of Mn is 0.7 atm % or more. It is still more preferable that the concentration of Mn is 0.9 atm % or more.

When the concentration of Mn of the dielectric green sheet is excessively large, the temperature at which the densification of the dielectric layer 11 is completed is reduced and the difference between the temperature at which the densification of the cover layer 13 is completed and the temperature at which the densification of the dielectric layer 11 is completed may be large. And so, it is preferable that the concentration of Mn of the dielectric green sheet has an upper limit. For example, it is preferable that the concentration of Mn of the dielectric green sheet is 0.25 atm % or less, on a presumption that the concentration of the B site element of the main component ceramic having the perovskite structure expressed by the general formula $ABO_3$ is 100 atm %. It is more preferable that the concentration of Mn is 0.20 atm % or less. It is still more preferable that the concentration of Mn is 0.15 atm % or less.

Another method other than the method making the difference of the particle diameters of the dielectric green sheets may be used for providing the gradation of the average crystal grain diameter of the dielectric layers 11. For example, an amount of the binder of one of the dielectric green sheet on the side of the cover sheet may be smaller than that of 10 to 20 numbers of the dielectric green sheets on the side of the center in the stacking direction. For example, the amount of the binder of one of the dielectric green sheets on the side of the center in the stacking direction may be larger than that of outermost 10 to 20 number of the dielectric green sheets on the side of the cover layer 13 by 10% to 20%, between the center of the multilayer structure and the cover layer 13. In this case, in the firing process, the binder is decomposed by oxygen in atmosphere of the firing process. The binder reduces the dielectric layer 11. When the amount of the binder before the firing gets larger, reduction power gets larger. The concentration of Mn of the dielectric green sheet near the cover sheet caused by diffusion is larger than that of the dielectric sheet on the side of the center in the stacking direction. And, grain growth of the dielectric green sheet near the cover sheet is suppressed more than that of the dielectric green sheet on the side of the center in the stacking direction, because the reduction force caused by the binder is small in the dielectric green sheet near the cover sheet. Therefore, in the capacity section 14, the average crystal grain diameter of the dielectric layer 11 on the side of the cover layer 13 is smaller than that of the dielectric layer 11 on the side of the center in the stacking direction. The amount of the binder is a weight ratio of the binder with respect to the main component ceramic, In the embodiments, the multilayer ceramic capacitor is described as an example of ceramic electronic devices. However, the embodiments are not limited to the multilayer ceramic capacitor. For example, the embodiments may be applied to another electronic device such as varistor or thermistor.

Examples (Making of the dielectric material) In an example 1, $Ho_2O_3$, MgO, $MnCO_3$ and $SiO_2$ were weighed so that the concentrations of Ho, Mg, Mn and Si were 1.0 atm %, 0.5 atm %, 0.3 atm %, and 1.0 atm % with respect to the concentration of the barium titanate powder. The materials were wet-blended and crushed in a ball mil. And, the dielectric material was obtained. In the resulting dielectric material, Ba/(Ti+Zr) was 1.0100 in an atomic concentration ratio. The concentrations of Ho, Mg, Mn and Si were atm % of Ho, Mg, Mn and Si on a presumption that the concentration of Ti in the barium titanate was 100 atm %. In examples 2 to 5, the concentration of Mn was 0.1 atm %. In an example 6, the concentration of Mn was 0.25 atm %.

(Making of the cover material) In the example 1, $Ho_2O_3$, MgO, $MnCO_3$ and $SiO_2$ were weighed so that the concentrations of Ho, Mg, Mn and Si were 1.0 atm %, 0.5 atm %, 1.3 atm %, and 1.0 atm % with respect to the concentration of the barium titanate powder. The materials were wet-blended and crushed in a ball mil. And, the cover material was obtained. In the resulting cover material, Ba/(Ti+Zr) was 1.0100 in an atomic concentration ratio. The concentrations of Ho, Mg, Mn and Si were atm % of Ho, Mg, Mn and Si on a presumption that the concentration of Ti in the barium titanate was 100 atm %. In the example 2, the concentration of Mn was 1.3 atm %. In the example 3, the concentration of Mn was 1.0 atm %. In the example 4, the concentration of Mn was 0.8 atm %. In the example 5, the concentration of Mn was 0.4 atm %. In the example 6, the concentration of Mn was 0.5 atm %.

(Making of multilayer ceramic capacitors) Next, butyral acting as a binder, toluene acting as a solvent, and ethyl alcohol were added to the dielectric material. And dielectric green sheets were made by a doctor blade method. Metal conductive paste for forming an internal electrode layer was printed on each of the dielectric green sheets. 500 numbers of the dielectric green sheets on which the metal conductive paste was printed were stacked. In this case, in the multilayer structure of the dielectric green sheets, a particle diameter of the main component ceramic powder of uppermost 10 numbers lowermost 10 numbers of the dielectric green sheets was larger than that of another dielectric green sheets by 20%. In concrete, in the multilayer structure of the dielectric green sheets, the average particle diameter of the main component ceramic of the uppermost 10 numbers of the dielectric green sheets and the lowermost 10 numbers of the dielectric green sheets was 120 nm. The average particle diameter of the main component ceramic of other dielectric green sheets was 100 nm.

Next, butyral acting as an organic binder, toluene acting as a solvent, and ethyl alcohol were added to the cover material. And cover sheets were made by a doctor blade method. One of the cover sheets was stacked on the stacked dielectric green sheets. The other of the covers sheets was stacked under the stacked dielectric green sheets. After that, the ceramic multilayer structure was obtained by a thermal compressing. The thickness of the each of the cover sheets was 30 μm. And the ceramic multilayer structure was cut into a predetermined size. The binder was removed from the ceramic multilayer structure in $N_2$ atmosphere. Ni external electrodes were formed on both end faces of the ceramic multilayer structure by a dipping method. After that, the resulting ceramic multilayer structure was fired in a reductive atmosphere (Oxygen partial pressure: $10^{-5}$ to $10^{-8}$ atm) at a temperature of 1250 degrees C. And, a sintered structure was formed. The sintered structure had a length of 1.0 mm, a width of 0.5 mm and a height of 0.5 mm. Next, the sintered structure was subjected to the re-oxidation process in $N_2$ atmosphere at 800 degrees C. After that, the surface of the external electrodes were coated with metals of Cu, Ni and Sn by a plating. Thus, the multilayer ceramic capacitor 100 was obtained. After the firing, the thickness of the dielectric layers 11 was 0.5 μm. The thickness of the internal electrode layers 12 was 0.4 μm.

Figure 6A:
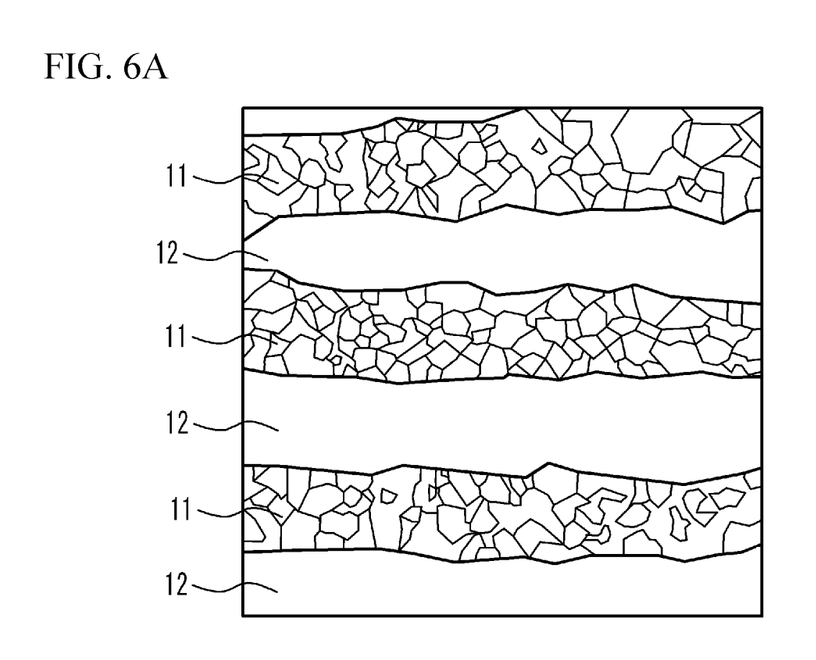
FIG. 6A schematically illustrates a SEM image of a cross section near a cover layer.
Figure 6B:
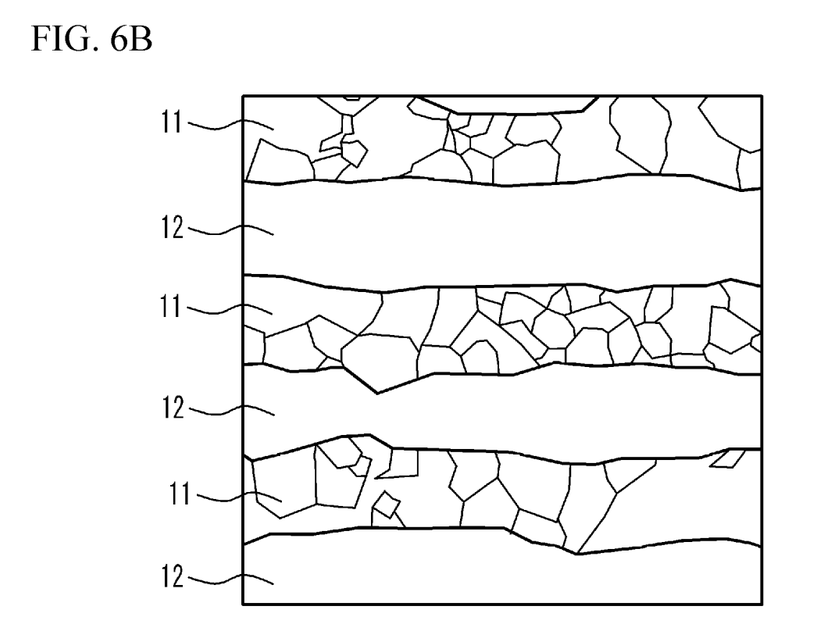
FIG. 6B schematically illustrates a SEM image of a cross section of a center section in a stacking direction.

FIG. 6A schematically illustrates a SEM image of the cross section near the cover layer 13 of the example 13. FIG. 6B schematically illustrates a SEM image of the cross section of the center section in the stacking direction of the example 3. As illustrated in FIG. 6A and FIG. 6B, the average crystal grain diameter of the dielectric layer 11 near the cover layer 13 was small. On the other hand, the average crystal grain diameter of the dielectric layer 11 of the center section in the stacking direction was large. In concrete, the average crystal grain diameter of the dielectric layer 11 (the first dielectric layer) which was fifth layer from the cover layer 13 was 151 nm. The average crystal grain diameter of the dielectric layer 11 (the second dielectric layer) which was 250-th layer from the cover layer 13 was 302 nm.

(Calculation method of the average crystal grain diameter) The cross section was extracted by grinding samples of the multilayer ceramic capacitors. The average crystal grain diameter was calculated from the cross section image captured by a SEM (Scanning Electron Microscope). In the description, the average crystal grain diameter is defined as an average of maximum lengths of crystal grains after the firing in a direction in parallel with the internal electrode layers (vertical to the electrical field). The number of the samples was 500 or more, with respect the sampling of the dielectric sintered grains of which the average crystal grain diameter was to be measured. When the number of the crystal grains was 500 or more in a single observed area (single image magnified with 30000 magnification by the SEM), all of the crystal grains were sampled. When the number of the crystal grains was less than 500 in a single observed area, a plurality of areas were observed and a total number of the crystal grains was adjusted to 500 or more.

In the example 1, the average crystal grain diameter of the dielectric layer 11 (the first dielectric layer) which was the fifth layer from the cover layer 13 was 131 nm. And, the average crystal grain diameter of the dielectric layer 11 (the second dielectric layer) which was the 250-th layer from the cover layer 13 was 285 nm. In the example 2, the average crystal grain diameter of the dielectric layer 11 (the first dielectric layer) which was the fifth layer from the cover layer 13 was 130 nm. And, the average crystal grain diameter of the dielectric layer 11 (the second dielectric layer) which was the 250-th layer from the cover layer 13 was 297 nm. In the example 4, the average crystal grain diameter of the dielectric layer 11 (the first dielectric layer) which was the fifth layer from the cover layer 13 was 162 nm. And, the average crystal grain diameter of the dielectric layer 11 (the second dielectric layer) which was the 250-th layer from the cover layer 13 was 304 nm. In the example 5, the average crystal grain diameter of the dielectric layer 11 (the first dielectric layer) which was the fifth layer from the cover layer 13 was 182 nm. And, the average crystal grain diameter of the dielectric layer 11 (the second dielectric layer) which was the 250-th layer from the cover layer 13 was 311 nm. In the example 6, the average crystal grain diameter of the dielectric layer 11 (the first dielectric layer) which was the fifth layer from the cover layer 13 was 155 nm. And, the average crystal grain diameter of the dielectric layer 11 (the second dielectric layer) which was the 250-th layer from the cover layer 13 was 290 nm.

Figure 7:
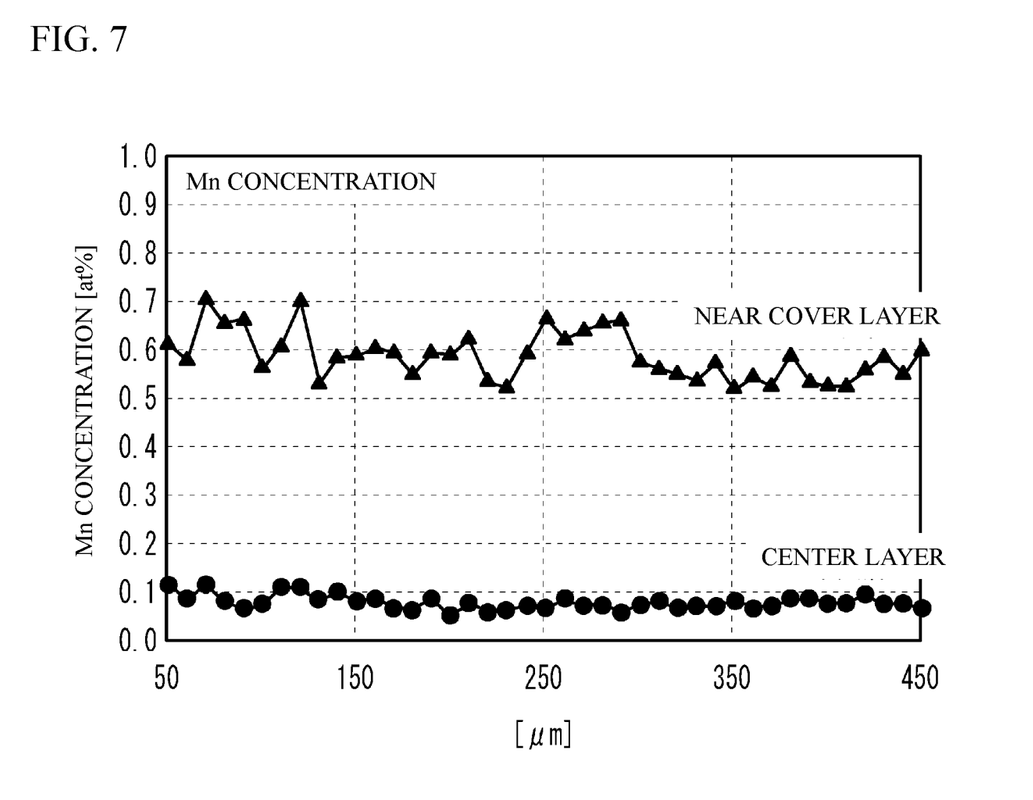
FIG. 7 illustrates a graph indicating a concentration of Mn of a dielectric layer on a side of a cover layer and a concentration of Mn on a side of a center section in a stacking direction.

FIG. 7 illustrates a graph indicating the concentration of Mn of the dielectric layer 11 which is fifth layer from the cover layer 13 and the concentration of Mn of the dielectric layer 11 which is 250-th layer from the cover layer 13, in the example 13. In FIG. 7, the vertical axis indicates a position in the direction in which the side margin sections 16 face with each other. As shown in FIG. 7, the concentration of Mn of the dielectric layer 11 near the cover layer 13 is large. The concentration of Mn of the dielectric layer 11 in the center section in the stacking direction is small.

From the results, in the capacity section 14, the average crystal grain diameter of the dielectric layer 11 is smaller and the concentration of Mn is larger in one of the dielectric layers 11 on the side of the cover layer 13, and the average crystal grain diameter is larger and the concentration of Mn is smaller in another of the dielectric layer 11 on the side of the center section in the stacking direction, when the concentration of Mn of the cover material is larger than the concentration of Mn of the dielectric material and the average particle diameter of the main component ceramic powder of 10 to 20 numbers of dielectric green sheets or the like on the side of the cover layer 13 is larger than the average particle diameter of the main component ceramic powder of another of the dielectric green sheet on the side of the center section in the stacking direction by 10% to 20% or the like.

Table 1 shows the amount of Mn of the cover material, the amount of Mn of the dielectric material, the average crystal grain diameters of the first dielectric layer and the second dielectric layer, the resistance to humidity, the results of the accelerated lifetime test, and the DC bias characteristic.

(Test of resistance to humidity) With respect to each of the example 1 to 6, a test of resistance to humidity was performed in a condition that the number of samples was 500, the temperature was 125 degrees C., the relative humidity was 95% RH, the applied direct current voltage was 5 Vdc, and the time was 100 h. Just after the test, the samples were brought out from the bath having resistance to humidity. Electrical resistances of the samples were measured when the temperature returned to the room temperature. The samples in which the electrical resistance was less than 1 MO were determined as bad. The ratio of the samples determined as bad with respect to all samples was measured as fractional defective.

(Test of accelerated lifetime) With respect to each of the examples 1 to 6, time until insulation of samples was broken was measured in a condition that the number of samples was 20, the temperature was 125 degrees C., the applied direct current voltage was 10 Vdc. A median value of the time until the insulation of the 30 samples was broken was calculated as a lifetime.

(DC bias characteristic) With respect to each of the examples 1 to 6, electrostatic capacity (Cap1) at 0 Vdc of the applied direct current voltage and electrostatic capacity (Cap2) at 3 Vdc of the applied direct current voltage were measured in a condition that the number of samples was 3, the temperature was the room temperature, and the applied alternate current voltage was 120 Hz-0.5 Vrms. An average of the changing rates: 100×((Cap2)−(Cap1))/(Cap1) was defined as the DC bias characteristic.

TABLE 1

| | Mn AMOUNT OF COVER MATERIAL (atm %) | Mn AMOUNT OF DIELECTRIC MATERIAL (atm %) | AVERAGE GRAIN DIAMETER OF FIRST DIELECTRIC LAYER(nm) | AVERAGE GRAIN DIAMETER OF SECOND DIELECTRIC LAYER(nm) | FRACTIONAL DEFECTIVE (%) | ACCELERATED LIFETIME TEST (min) | BIAS CHARACTERISTIC (%) |
|---|---|---|---|---|---|---|---|
| EXAMPLE 1 | 1.3 | 0.3 | 131 | 285 | 0 | 198 | −64 |
| EXAMPLE 2 | 1.3 | 0.1 | 130 | 297 | 0 | 201 | −55 |
| EXAMPLE 3 | 1.0 | 0.1 | 151 | 302 | 0 | 243 | −56 |
| EXAMPLE 4 | 0.8 | 0.1 | 162 | 304 | 0 | 155 | −58 |
| EXAMPLE 5 | 0.4 | 0.1 | 182 | 311 | 10 | 105 | −54 |
| EXAMPLE 6 | 0.5 | 0.25 | 155 | 290 | 5 | 56 | −62 |

In anyone of the examples 1 to 6, the resistance to humidity, the accelerated lifetime test result and the bias characteristic were favorable. It is thought that the amount of Mn of the cover material was larger than the amount of Mn of the dielectric material, the concentration of Mn of the cover layer 13 was larger than the concentration of Mn of the dielectric layer 11 in the capacity section 14, the concentration of Mn of the first dielectric layer was larger than the concentration of Mn of the second dielectric layer, and the average crystal grain diameter of the first dielectric layer was smaller than that of the second dielectric layer.

The reliability (resistance to humidity and accelerated lifetime) and the effective capacity (bias characteristic) of the examples 2 to 4 were more favorable than those of the examples 1, 5 and 6. It is thought that this was because the amount of Mn of the cover material was 0.5 atm % or more, the amount of Mn of the dielectric material was 0.25 atm % or less, and the difference of the concentrations of Mn was 0.3% or more.

Although the embodiments of the present invention have been described in detail, it is to be understood that the various change, substitutions, and alterations could be made hereto without departing from the spirit and scope of the invention.

What is claimed is:

1. A ceramic electronic device comprising:
a multilayer structure in which each of a plurality of dielectric layers and each of a plurality of internal electrode layers are alternately stacked, a main component of the dielectric layers being ceramic, the multilayer structure having a rectangular parallelepiped shape, the plurality of internal electrode layers being alternately exposed to a first edge face and a second edge face of the multilayer structure, the first edge face facing with the second edge face; and
a cover layer that is provided at least on an upper face and a lower face of the multilayer structure in a stacking direction of the multilayer structure, a main component of the cover layer being ceramic,
wherein a concentration of Mn of the cover layer with respect to a main component ceramic of the cover layer is larger than a concentration of Mn of the dielectric layers with respect to a main component ceramic of the dielectric layers in a capacity section in which a set of internal electrode layers exposed to the first edge face of the multilayer structure face with another set of internal electrode layers exposed to the second edge face of the multilayer structure,
wherein an average crystal grain diameter of a first dielectric layer is smaller than that of a second dielectric layer, and a concentration of Mn of the first dielectric layer with respect to the main component ceramic is larger than a concentration of Mn of the second dielectric layer with respect to the main component ceramic, in the capacity section,
wherein the first dielectric layer is one of the dielectric layers on a side of the cover layer, and the second dielectric layer is another of the dielectric layers on a side of a center section in the stacking direction; and
wherein the average crystal diameter of the plurality of dielectric layers increases gradually or in steps from the center section towards a first end in the stacking direction, and decreases gradually or in steps from the center section towards a second end in the stacking direction, opposite to the first end of the stacking direction.

2. The ceramic electronic device as claimed in claim 1, wherein the average crystal grain diameter of the first dielectric layer is less than 250 nm.

3. The ceramic electronic device as claimed in claim 1, wherein the average crystal grain diameter of the second dielectric layer is 250 nm or more.

4. The ceramic electronic device as claimed in claim 1, wherein the concentration of Mn of the first dielectric layer is 1.5 atm % or less with respect to a concentration of a main component ceramic of the first dielectric layer.

5. The ceramic electronic device as claimed in claim 1,
wherein, in two or more of the dielectric layers, the average crystal grain diameter increases gradually or in steps from the cover layer side toward the center section side in the stacking direction,
wherein, in the two or more of the dielectric layers, the concentration of Mn with respect to a main component ceramic decrease gradually or in steps, from the cover layer side toward the center section side in the stacking direction.

6. The ceramic electronic device as claimed in claim 1, wherein the concentration of Mn of the cover layer is 0.5 atm % or more with respect to a concentration of a main component ceramic of the cover layer.

7. The ceramic electronic device as claimed in claim 1, wherein an average thickness of each of the dielectric layers in the capacity section is 0.8 μm or less.

8. The ceramic electronic device as claimed in claim 1, wherein a size of the ceramic electronic device is a length of 0.4 mm, a width of 0.2 mm and a height of 0.2 mm.

9. The ceramic electronic device as claimed in claim 1, further comprising:
a first external electrode provided on the first edge face; and
a second external electrode provided on the second edge face,
wherein a non-capacitive end margin is defined by a space in which a set of the internal electrode layers connected to the first external electrode do not sandwich an intermediate internal electrode layer connected to the second external electrode, or a space in which a set of the internal electrode layers connected to the second external electrode do not sandwich an intermediate internal electrode layer connected to the first external electrode.

* * * * *